(12) United States Patent
Hashimoto et al.

(10) Patent No.: US 8,010,233 B2
(45) Date of Patent: Aug. 30, 2011

(54) IMAGE PROCESSOR FOR ROBOT SYSTEM AND ROBOT SYSTEM INCLUDING THE SAME

(75) Inventors: Yoshiki Hashimoto, Yamanashi (JP); Takehisa Sera, Yamanashi (JP); Shougo Takahashi, Yamanashi (JP)

(73) Assignee: FANUC Ltd., Yamanashi (JP)

( * ) Notice: Subject to any disclaimer, the term of this patent is extended or adjusted under 35 U.S.C. 154(b) by 0 days.

(21) Appl. No.: 12/829,765

(22) Filed: Jul. 2, 2010

(65) Prior Publication Data

US 2011/0007216 A1    Jan. 13, 2011

(30) Foreign Application Priority Data

Jul. 8, 2009   (JP) ................... 2009-161937

(51) Int. Cl.
*B25J 19/04* (2006.01)
*H04N 5/06* (2006.01)
*H04N 5/073* (2006.01)
*G06T 1/20* (2006.01)

(52) U.S. Cl. ........................ 700/259; 700/245

(58) Field of Classification Search .................. 700/245, 700/259; 382/153; *H04N 5/06, 5/073, 5/04; B25J 19/04; G06T 1/20*
See application file for complete search history.

(56) References Cited

U.S. PATENT DOCUMENTS

| | | | | |
|---|---|---|---|---|
| 4,468,695 A * | 8/1984 | Ikeda et al. | ...... | 348/94 |
| 4,706,120 A * | 11/1987 | Slaughter et al. | ...... | 348/114 |
| 4,843,287 A * | 6/1989 | Taft | ...... | 318/568.16 |
| 5,175,616 A * | 12/1992 | Milgram et al. | ...... | 348/47 |
| 5,194,791 A * | 3/1993 | Cull | ...... | 318/568.1 |
| 5,255,096 A * | 10/1993 | Boyle | ...... | 348/95 |
| 5,331,413 A * | 7/1994 | Diner | ...... | 348/159 |
| 5,719,953 A * | 2/1998 | Okabayashi et al. | ...... | 382/151 |
| 6,047,134 A * | 4/2000 | Sekine et al. | ...... | 396/55 |
| 2003/0120390 A1* | 6/2003 | Hopkins | ...... | 700/259 |
| 2009/0088897 A1* | 4/2009 | Zhao et al. | ...... | 700/250 |

FOREIGN PATENT DOCUMENTS

| | | |
|---|---|---|
| JP | 5137054 A | 6/1993 |
| JP | 09-224192 | 8/1997 |
| JP | 11-215412 | 8/1999 |
| JP | 2009010903 A | 1/2009 |

* cited by examiner

*Primary Examiner* — Khoi Tran
*Assistant Examiner* — Dale Moyer
(74) *Attorney, Agent, or Firm* — Lowe Hauptman Ham & Berner, LLP

(57) ABSTRACT

An image processor for a robot system, performing image processing for a video signal output from a camera. The camera can output a first video signal including obtained image data as well as internal vertical and horizontal synchronization signals, and output a second video signal including image data obtained based on external vertical and horizontal synchronization signals as well as the external vertical and horizontal synchronization signals. The image processor includes a synchronization signal separation section separating the internal horizontal synchronization signal from the first video signal output from the camera; a synchronization frequency detection section detecting a frequency of the separated internal horizontal synchronization signal; an external synchronization signal generation section generating the external vertical and horizontal synchronization signals; and a processing section allowing, at desired timing, the external synchronization signal generation section to generate the external vertical synchronization signal, to generate the external horizontal synchronization signal at the detected frequency of the internal horizontal synchronization signal, and to supply the generated external vertical and horizontal synchronization signals to the camera.

6 Claims, 6 Drawing Sheets

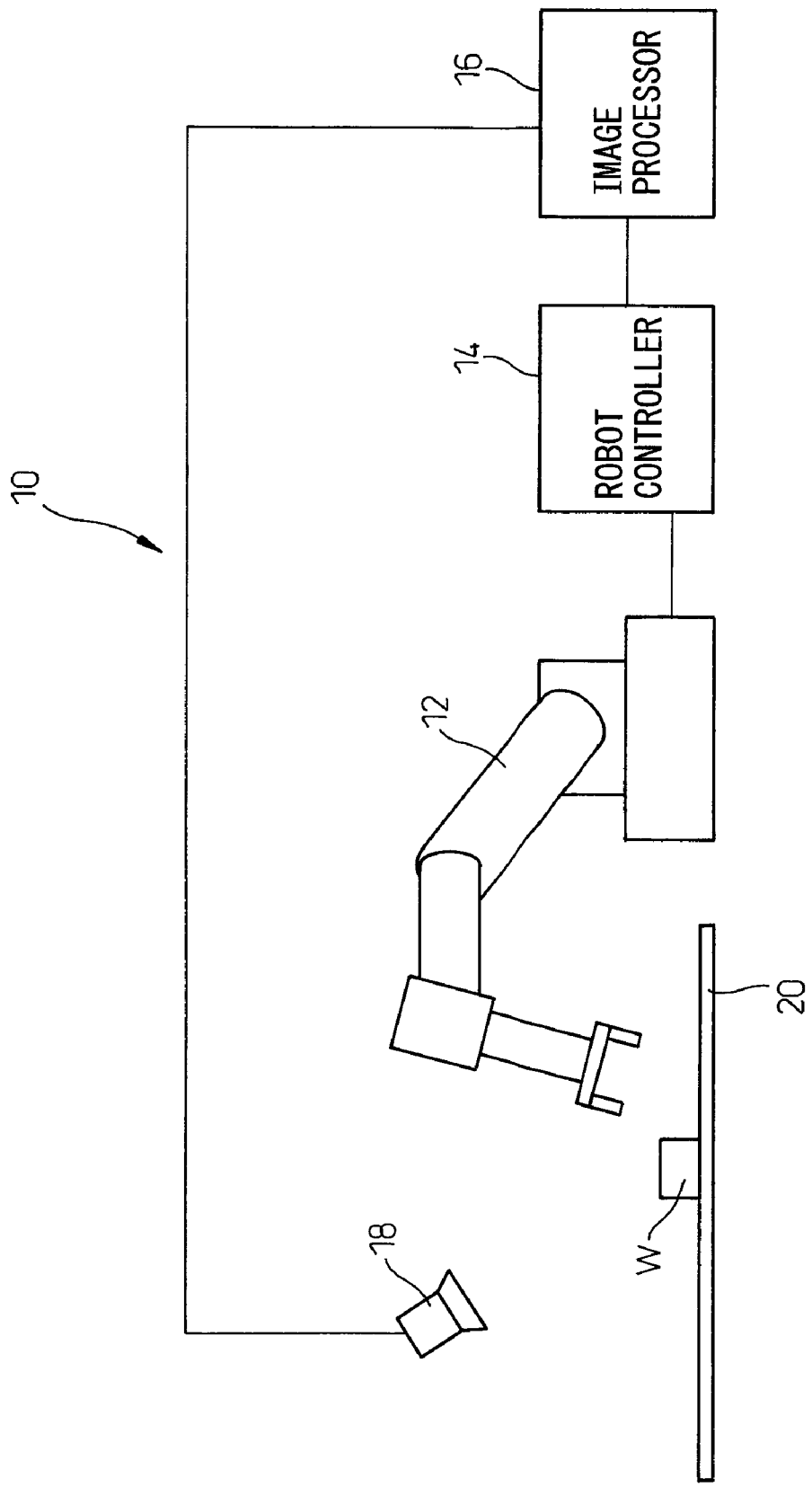

IMAGE PROCESSOR FOR ROBOT SYSTEM AND ROBOT SYSTEM INCLUDING THE SAME

RELATED APPLICATIONS

The present application is based on, and claims priority from, Japanese Application Number 2009-161937, filed Jul. 8, 2009, the disclosure of which is hereby incorporated by reference herein in its entirety.

BACKGROUND OF THE INVENTION

1. Field of the Invention

The present invention relates to an image processor for a robot system. The present invention also relates to a robot system including an image processor.

2. Description of the Related Art

An area image sensor, such as a CCD camera, (hereinafter referred to as a "camera") typically scans an image formed on an imaging device, in which pixels are arranged in a matrix, horizontally from the top left of the image and sequentially outputs electric signals of the pixels of a single scan line. When the camera scans throughout the line to the right end of the image, it returns to the head of a subsequent line to scan the subsequent line and output the electric signals thereof. The camera repeatedly performs the operation described above, and thereby scans entirely a single image and output a video signal of the single image. Two scan modes are known: one being a progressive mode in which a camera scans lines in sequence from top down and outputs the video signal of an entire image; and the other being an interlace mode in which a camera scans every other line and outputs the video signal of odd-numbered lines (i.e., a first field) and the video signal of even-numbered lines (i.e., a second field), so as to output the total video signal of an entire image.

The video signal of a dynamic image includes a plurality of successive frames, wherein a frame represents image data of a single entire image including image data of a plurality of lines. Consequently, in order for an image processor to process the video signal of the dynamic image, it is necessary that the image processor recognizes the starting position of each frame (or field) and the starting position of each line, in the video signal input from a camera to the image processor, so as to synchronize the timing of the beginning of the video signal and the timing of the beginning of the image processing. For this purpose, the video signal includes a vertical synchronization signal indicating the starting position of each frame (or field) and a horizontal synchronization signal indicating the starting position of each line, in addition to the image data. The vertical synchronization signal and the horizontal synchronization signal may be provided as an internal synchronization signal generated in the camera, or alternatively, as an external synchronization signal generated by the image processor at a frequency identical to a frequency of the internal synchronization signal. In an internal synchronization mode using the internal synchronization signal, the image processor separates the internal synchronization signal from the video signal output from the camera and uses the internal synchronization signal, so as to synchronize the image processing. In an external synchronization mode using the external synchronization signal, the image processor supplies the generated external synchronization signal to the camera and allows the camera to output the video signal synchronized with the external synchronization signal, so as to synchronize the image processing. In the camera adopting the external synchronization mode, when the external synchronization signal is not provided, the camera may automatically output the video signal synchronized with the internal synchronization signal.

A camera may have individual difference, such as a slight difference in characteristics of an imaging device, the attachment position of a lens, and the like. Consequently, when the camera connected to an image processor is replaced with another camera, it may be necessary for the image processor to adjust the settings of a white balance, a focus, an exposure, and the like. Japanese Unexamined Patent Publication (Kokai) No. 11-215412 (JP-A-11-215412) describes a video image input device that automatically adjusts the settings so as to absorb the individual difference of a camera when the camera is replaced with another camera.

Further, the internal synchronization signals of cameras are generated independently of each other. Consequently, when a plurality of different cameras generating internal synchronization signals at the same time are connected to a single image processor, it may be necessary for the image processor to control the timing of the internal synchronization signals. Japanese Unexamined Patent Publication (Kokai) No. 9-224192 (JP-A-9-224192) describes a picture synthesizer, in which, when a plurality of different cameras generating internal synchronization signals at the same time are connected to a single image processor and images captured by the cameras are simultaneously displayed on a monitor, the image processor provides external synchronization signals to the respective cameras so as to allow the cameras to output the video signals at appropriate timing.

In a robot system that uses an image processor for correcting an operation of a robot based on image data obtained from a camera, if a robot controller cannot recognize which timing the image data obtained from the camera is captured, the robot controller cannot appropriately correct the operation of the robot. For example, in the case where the robot operates to hold an object conveyed on a conveyor, if the robot controller does not accurately recognize which timing the image data obtained from the camera is captured, the robot controller may incorrectly estimate a time when the object reaches a predetermined position and thus may make it difficult for the robot to hold the object. In order to avoid this problem, the robot system is configured in such a manner that the image processor provides the camera with the external synchronization signal generated at the same period as the internal synchronization signal of the camera and allows the camera to output the image data synchronized with the external synchronization signal, so that the operation of the robot can be corrected based on a result of the image processing of the image data obtained at desired timing. To this end, it may be necessary to previously set, in the image processor, a synchronization signal frequency suitable for the camera connected to the image processor, and to provide the connected camera with the external synchronization signal suitable for the said camera.

The frequencies of vertical and horizontal synchronization signals, suitable for a camera, are specific to each type of cameras, regardless of whether the synchronization signals are internal or external. If the vertical and horizontal synchronization signals having frequencies different from the specific frequencies are provided as the external synchronization signal to the camera, malfunctions, such as distortion of an image, may occur. Consequently, when the image processor provides the external synchronization signal to the camera, it may be necessary to set the frequency of the external synchronization signal to be identical to the frequency of the internal synchronization signal of the camera connected to the image processor.

Further, when an image processing is performed based on an image output from a camera, the image processing is performed after image data, an amount of which corresponds to the number of pixels of the camera connected to an image processor, is stored in a storage section, such as a RAM, of the image processor. On the other hand, the number of pixels of the camera may vary with the type of the camera. As a result, it may be necessary to previously allocate a data area for image processing to the storage section, such as the RAM, in consideration of the number of pixels of the camera connected to the image processor.

Consequently, in the robot system, when several types of cameras are connected to the image processor simultaneously or alternately, in order to provide the connected camera (or cameras) with external synchronization signal (or signals) having a frequency (or frequencies) suitable for the camera (or cameras), it may be necessary to previously set, in the image processor, the frequency (or frequencies) of the external synchronization signal (or signals) to be identical to the frequency (or frequencies) of the internal synchronization signal (or signals) of the connected camera (or cameras). Further, in order to store the image data, the amount of which corresponds to the number of pixels of the camera (or cameras) in the storage section, such as the RAM, of the image processor, it may be necessary to previously allocate the data area for image processing to the storage section, such as the RAM, in consideration of the number of pixels of the connected camera (or cameras).

However, the aforementioned setting and allocation have conventionally been manually performed by an operator depending on the type of the camera in use, and therefore, errors may occur in the setting and allocation, which may cause malfunctions, such as inability of the image processor to import image data.

Further, the video image input device as set forth in JP-A-11-215412 or the picture synthesizer as set forth in JP-A-9-224192 cannot automatically perform, when a connected camera is replaced with a different type of camera, the setting of the frequency of a synchronization signal depending on the type of the camera and the allocation of a data area for image processing depending on the number of pixels of the camera.

SUMMARY OF THE INVENTION

The present invention provides, as one aspect, an image processor for a robot system, to which several types of cameras can be connected, and which can automatically set, e.g., the frequency of a synchronization signal, depending on the type of the connected camera.

According to one aspect of the present invention, an image processor for a robot system is provided, the robot system comprising a camera having a first function outputting a first video signal including obtained image data as well as an internal vertical synchronization signal and an internal horizontal synchronization signal, generated as an internal synchronization signal at a predetermined frequency, and a second function outputting a second video signal including image data obtained based on an external vertical synchronization signal and an external horizontal synchronization signal, supplied as an external synchronization signal having a frequency identical to the frequency of the internal synchronization signal, as well as the external vertical synchronization signal and the external horizontal synchronization signal, the image processor configured to import the second video signal output from the camera and perform image processing, wherein the image processor comprises a synchronization signal separation section separating the internal horizontal synchronization signal from the first video signal output from the camera; a synchronization frequency detection section detecting a frequency of the internal horizontal synchronization signal separated by the synchronization signal separation section; an external synchronization signal generation section generating the external vertical synchronization signal and the external horizontal synchronization signal; and a processing section allowing, at desired timing, the external synchronization signal generation section to generate the external vertical synchronization signal, to generate the external horizontal synchronization signal at the frequency of the internal horizontal synchronization signal detected by the synchronization frequency detection section, and to supply the external vertical synchronization signal and the external horizontal synchronization signal, thus generated, to the camera.

The present invention provides, as another aspect, a robot system capable of being provided with several types of cameras, which includes an image processor capable of automatically setting, e.g., the frequency of a synchronization signal, depending on the type of the connected camera.

According to the other aspect of the present invention, a robot system performing a robot operation based on a result of image processing is provided, the robot system comprising a robot; a camera having a first function outputting a first video signal including obtained image data as well as an internal vertical synchronization signal and internal horizontal synchronization signal, generated as an internal synchronization signal at a predetermined frequency, and a second function outputting a second video signal including image data obtained based on an external vertical synchronization signal and an external horizontal synchronization signal, supplied as an external synchronization signal having a frequency identical to the frequency of the internal synchronization signal, as well as the external vertical synchronization signal and the external horizontal synchronization signal; and an image processor configured to import the second video signal output from the camera and perform an image processing, wherein the image processor comprises a synchronization signal separation section separating the internal horizontal synchronization signal from the first video signal output from the camera; a synchronization frequency detection section detecting a frequency of the internal horizontal synchronization signal separated by the synchronization signal separation section; an external synchronization signal generation section generating the external vertical synchronization signal and the external horizontal synchronization signal; and a processing section allowing, at desired timing, the external synchronization signal generation section to generate the external vertical synchronization signal, to generate the external horizontal synchronization signal at the frequency of the internal horizontal synchronization signal detected by the synchronization frequency detection section, and to supply the external vertical synchronization signal and the external horizontal synchronization signal, thus generated, to the camera.

BRIEF DESCRIPTION OF THE DRAWINGS

The objects, features and advantages of the present invention will become more apparent from the following description of the embodiments in conjunction with the accompanying drawings, wherein:

FIG. 6 is an illustration depicting an overall configuration of a robot system according to an embodiment of the present invention.

DETAILED DESCRIPTION

Figure 1:
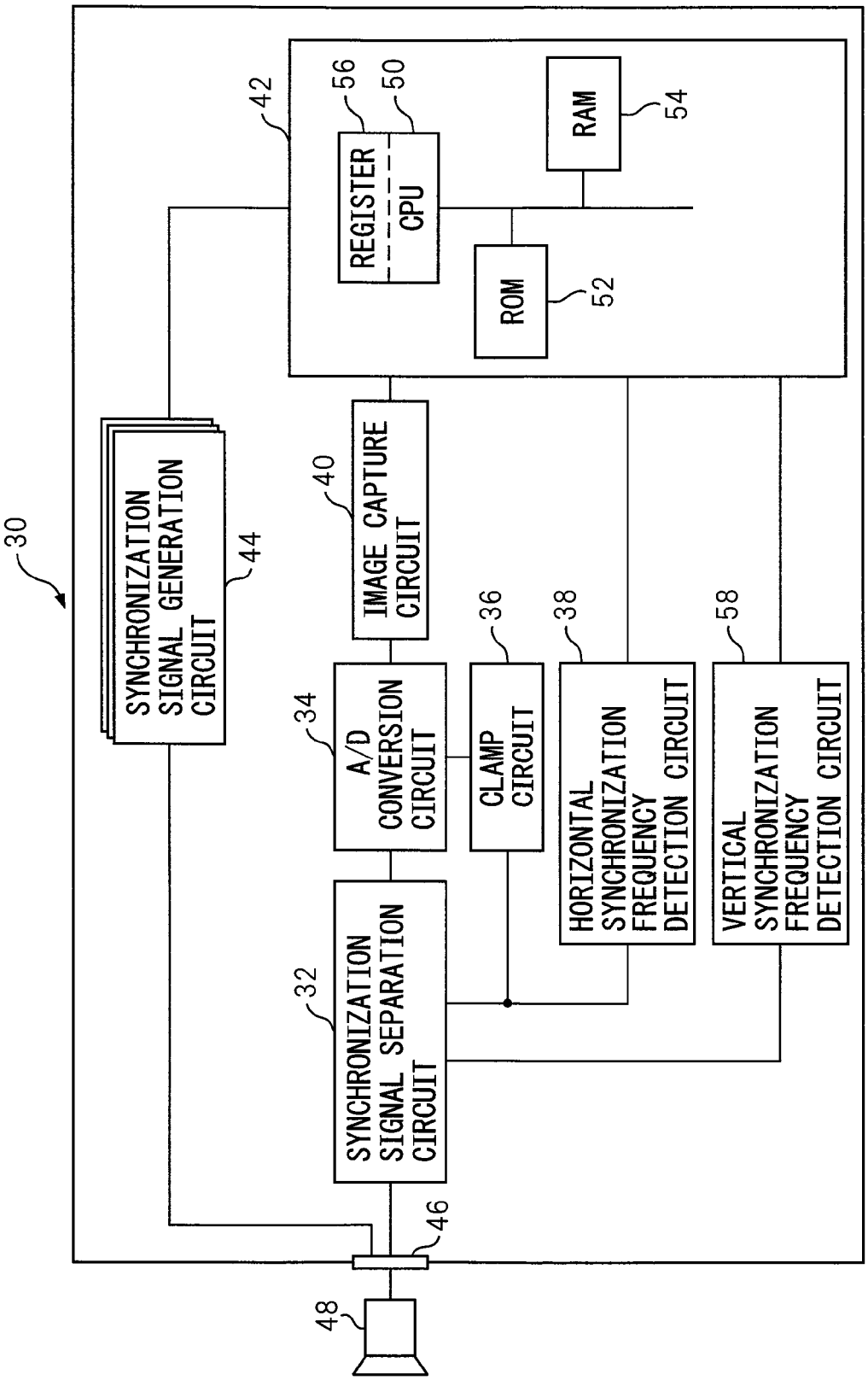
FIG. 1 is a block diagram depicting an overall configuration of an image processor according to a first embodiment of the present invention.

The embodiments of the present invention are described below, in detail, with reference to the accompanying drawings. Throughout the drawings, like components are denoted by common reference numerals.

Referring to FIG. 6, an overall configuration of a robot system 10 according to an embodiment of the present invention will be described. The robot system 10 includes a robot 12 operating to, e.g., hold a workpiece W; a robot controller 14 controlling the operations of the robot 12; an image processor 16 connected to the robot controller 14; and a camera 18 connected to the image processor 16.

In the embodiment depicted in FIG. 6, the workpiece W is moved by transfer means, such as a conveyor 20. The image processor 16 performs image processing to an image of the workpiece W captured by the camera 18 at desired timing, thereby recognizes the position of the workpiece W at the time when the workpiece W is captured, and transmits the recognized position of the workpiece W to the robot controller 14. The robot controller 14 estimates a time when the workpiece W reaches a predetermined target position based on the transmitted position of the workpiece W and the speed of the conveyor 20, and thereby makes the robot 12 hold the workpiece W having reached the target position and carry it to a next stage.

Though the image processor 16 is provided separately from the robot controller 14 in the depicted embodiment, the image processor 16 may be configured as a part of the robot controller 14.

Next, referring to FIGS. 1 to 5, several embodiments of an image processor that can be used as the image processor 16 depicted in FIG. 6, will be described.

Referring to FIG. 1, an image processor 30 according to a first embodiment will be described.

The image processor 30 includes a synchronization signal separation circuit (i.e., a synchronization signal separation section) 32, an A/D conversion circuit 34, a clamp circuit 36, a horizontal synchronization frequency detection circuit (i.e., a synchronization frequency detection section) 38, an image capture circuit 40, a processing section 42, a synchronization signal generation circuit (i.e., an external synchronization signal generation section) 44, and a single connector 46. A camera 48 for imaging the workpiece W and the like is connected to the image processor 30 via the connector 46.

The camera 48 is an area image sensor, such as a CCD camera, that can obtain two-dimensional image data. The camera 48 scans an image formed on an imaging device, in which pixels are arranged in a matrix, horizontally from the top left of the image and sequentially outputs electric signals of the pixels of a single scan line. When the camera 48 scans throughout the line to the right end of the image, it returns to the head of a subsequent line to scan the subsequent line and output the electric signals thereof. The camera 48 repeatedly performs the operation described above, and thereby scans entirely a single image and output a video signal of the single image. The camera 48 has an internal synchronization function (i.e., a first function) outputting a first composite video signal including the obtained image data as well as a vertical synchronization signal (i.e., an internal vertical synchronization signal) and a horizontal synchronization signal (i.e., an internal horizontal synchronization signal), generated as an internal synchronization signal at a predetermined specific frequency; and an external synchronization function (i.e., a second function) outputting a second composite video signal including image data obtained based on a vertical synchronization signal (i.e., an external vertical synchronization signal) and a horizontal synchronization signal (i.e., an external horizontal synchronization signal), supplied as an external synchronization signal having a frequency identical to the frequency of the internal synchronization signal, as well as the external vertical synchronization signal and the external horizontal synchronization signal. When the external synchronization signal is not supplied, the camera 48 outputs the video signal synchronized with the internal synchronization signal generated at the frequency specific to the type of the camera 48. On the other hand, when the external synchronization signal having a frequency identical to the frequency of the internal synchronization signal is supplied, the camera 48 outputs the video signal synchronized with the external synchronization signal. In this connection, the image data included in the video signal is a luminance signal as analog image data.

In either of the internal synchronization signal or the external synchronization signal, the vertical synchronization signal indicates the starting position of each frame (or field) and the horizontal synchronization signal indicates the starting position of each line. In the depicted embodiment, as described above, the camera 48 outputs the composite video signal (for monochrome or colored images), in which the analog image data (i.e., a luminance signal) is combined with the vertical synchronization signal and the horizontal synchronization signal. However, the camera 48 may output a Y/C signal including a luminance signal (Y signal) combined with a synchronization signal and a color signal (C signal) combined with a color synchronization signal, or an RGB signal including a red signal (R signal), a green signal (G signal) combined with a synchronization signal and a blue signal (B signal).

The synchronization signal separation circuit 32 has a known configuration that separates the vertical synchronization signal and the horizontal synchronization signal from the first and second video signals input from the camera 48, inputs the analog image data to the A/D conversion circuit 34 and inputs the separated horizontal synchronization signal to the clamp circuit 36 and the horizontal synchronization frequency detection circuit 38. Further, if desired, the synchronization signal separation circuit 32 inputs the separated vertical synchronization signal to a vertical synchronization frequency detection circuit 58 as described later.

The A/D conversion circuit 34 converts the analog image data input from the synchronization signal separation circuit 32 into digital image data. The clamp circuit 36 keeps the black level of the image data at the black level of the A/D conversion circuit 34 by using the horizontal synchronization signal input from the synchronization signal separation circuit 32, in order to restrain the fluctuation of the DC level of the analog image data input from the synchronization signal separation circuit 32 to the A/D conversion circuit 34 and make the DC level constant. By using the clamp circuit 36, the A/D conversion circuit 34 can accurately perform the A/D conversion of the image data.

The horizontal synchronization frequency detection circuit 38 detects the frequency of the horizontal synchronization signal input from the synchronization signal separation circuit 32 and sends it to the processing section 42. The image capture circuit 40 imports the digital image data converted from the analog image data in the A/D conversion circuit 34 into the processing section 42.

The processing section 42 includes a CPU (Central Processing Unit) 50, a ROM (Read Only Memory) 52, and a RAM (Random Access Memory) 54. The CPU 50 is provided with a register 56, and the frequency of the horizontal synchronization signal received from the horizontal synchronization frequency detection circuit 38 is stored in the register 56. The ROM 52 previously stores information about a correspondence relationship between a type of the camera 48, a frequency of the horizontal synchronization signal specific to the camera 48, and the number of pixels of the camera 48, relating to several types of cameras 48 that can be connected to the image processor 30. On the other hand, in the RAM 54, various programs, such as an image processing program or a camera identification program, are stored, and a data area for image processing is allocated depending on the number of pixels of the camera 48.

According to the various programs stored in the RAM 54, the CPU 50 performs image processing based on the digital image data. Further, according to the camera identification program stored in the RAM 54, the CPU 50 refers to the correspondence relationship previously stored in the ROM 52, so as to identify the type of the camera 48 and the number of pixels of the camera 48 based on the frequency of the horizontal synchronization signal as the internal synchronization signal of the camera 48, detected by the horizontal synchronization frequency detection circuit 38, and automatically allocates the data area for image processing to the RAM 54, depending on the identified number of pixels of the camera 48.

The synchronization signal generation circuit 44 belongs to a synchronization signal generation circuit group including a plurality of synchronization signal generation circuits 44. The synchronization signal generation circuits 44 in the synchronization signal generation circuit group are associated respectively with the several types of cameras 48 that can be connected to the connector 46, and each synchronization signal generation circuit 44 is previously configured to generate the vertical synchronization signal and the horizontal synchronization signal, as the external synchronization signal, at frequencies suitable for the associated type of camera 48. The CPU 50 selects the synchronization signal generation circuit 44 associated with the type of the camera 48, identified based on the frequency of the horizontal synchronization signal (i.e., the internal synchronization signal) of the camera 48 detected by the horizontal synchronization frequency detection circuit 38, from the synchronization signal generation circuit group, and allows the selected synchronization signal generation circuit 44 to, at desired timing, generate the vertical synchronization signal and the horizontal synchronization signal, as the external synchronization signal, and to supply them to the camera 48.

The image processor 30 may include the vertical synchronization frequency detection circuit 58 if desired. The vertical synchronization frequency detection circuit 58 detects the frequency of the vertical synchronization signal separated from the video signal by the synchronization signal separation circuit 32. The vertical synchronization frequency detection circuit 58 is effective in the case where the frequencies of the horizontal synchronization signals specific respectively to the several types of the cameras 48 are identical to each other, but the frequencies of the vertical synchronization signals specific respectively to the cameras 48 are different from each other. In this case, the ROM 52 in the processing section 42 further stores the frequency of the vertical synchronization signal specific to the camera 48 in correspondence with each type of the camera 48.

However, in the case where the type of the camera 48 can be unambiguously identified based on the frequency of the horizontal synchronization signal as the internal synchronization signal of the camera 48, detected by the horizontal synchronization frequency detection circuit 38, and only one synchronization signal generation circuit 44 corresponding to the identified type of the camera 48 can be selected, the selected synchronization signal generation circuit 44 generates the vertical synchronization signal and the horizontal synchronization signal at the frequencies corresponding to the type of the camera 48, and therefore, it is not necessary to detect the frequency of the vertical synchronization signal as the internal synchronization signal of the camera 48. Further, in the case where the image processor 30 is used in the robot system 10 (FIG. 6), it is necessary that the image processor 30 can at least recognize the position of the workpiece W based on the image (i.e., a still image) obtained by the camera 48 at desired timing. Therefore, if the vertical synchronization signal indicating the starting position of the image data of the single image and the subsequent horizontal synchronization signal having a predetermined frequency are supplied, as the external synchronization signal, to the camera 48 at the desired timing, the image processor 30 can recognize the image data output from the camera 48 at the said timing as the image data of the entire single image. Consequently, provided that the CPU 50 is configured to allow the synchronization signal generation circuit 44 to output the leading vertical synchronization signal and the subsequent horizontal synchronization signal having the predetermined frequency at the desired timing, the frequency of the vertical synchronization signal is not needed. Thus, the image processor 30 may include no vertical synchronization frequency detection circuit 58.

In this connection, the configuration in which the type of the camera 48 connected to the image processor 30 is identified mainly based on the frequency of the horizontal synchronization signal as the internal synchronization signal is adopted because the vertical synchronization signal often has a frequency common to the several types of the cameras 48, but the horizontal synchronization signal often has a frequency differently corresponding to each of the several types of the cameras 48.

Figure 5:
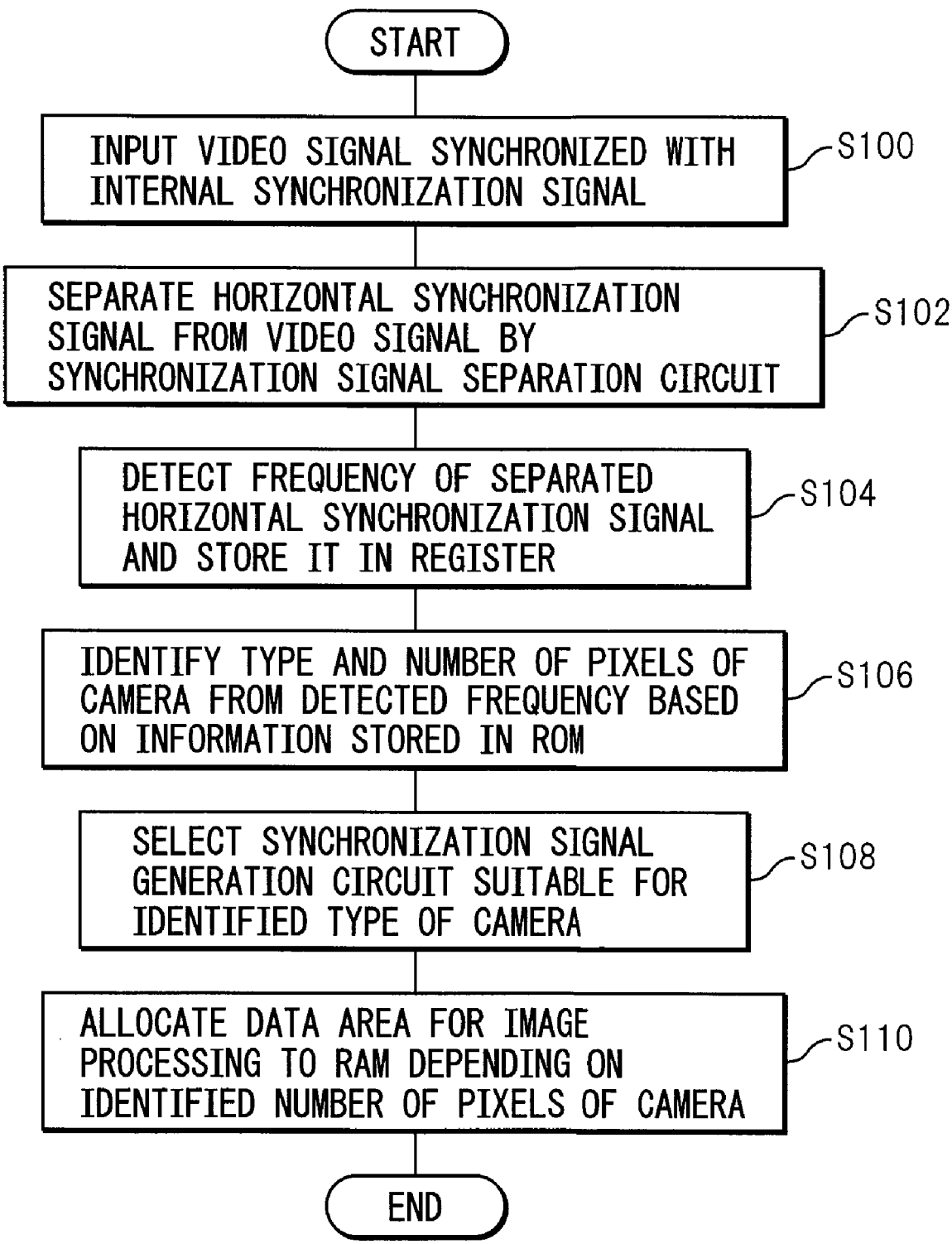
FIG. 5 is a flowchart depicting a preliminary preparation for image processing performed in the image processor depicted in FIG. 1.

Next, referring to FIG. 5, the operation of a preliminary preparation for image processing performed by the image processor 30 depicted in FIG. 1 will be described.

At the time when the image processor 30 is activated, the image processor 30 does not yet supply the external synchronization signal to the camera 48, and thus the camera 48 outputs the video signal synchronized with the internal synchronization signal due to the internal synchronization function. Therefore, the video signal synchronized with the internal synchronization signal is first input from the camera 48 to the image processor (step S100). The video signal output from the camera 48 is input to the synchronization signal separation circuit 32, and is separated into the image data, the horizontal synchronization signal (i.e., the internal synchronization signal) and the vertical synchronization signal (i.e., the internal synchronization signal) (step S102). The horizontal synchronization signal separated from the video signal by the synchronization signal separation circuit 32 is input to the horizontal synchronization frequency detection circuit 38 and the frequency of the horizontal synchronization signal is detected. The detected frequency of the horizontal synchronization signal is stored in the register 56 of the CPU 50 in the processing section 42 (step S104).

According to the camera identification program stored in the RAM 54, the CPU 50 in the processing section 42 reads the frequency of the (internal) horizontal synchronization signal of the camera 48 stored in the register 56. Then, the CPU 50 refers to the information about the correspondence relationship between the type, the horizontal synchronization signal frequency and the number of pixels, of the camera 48, previously stored in the ROM 52, and identifies the type and the number of pixels of the camera 48 connected to the connector 46 of the image processor 30 based on the frequency of the (internal) horizontal synchronization signal of the camera 48 (step S106). In this connection, the ROM 52 may previously store the information about the correspondence relationship between the type, the vertical synchronization signal frequency, the horizontal synchronization signal frequency and the number of pixels, of the camera 48, so that the type and the number of pixels of the camera 48 connected to the connector 46 of the image processor 30 can be identified based on the frequency of the (internal) horizontal synchronization signal detected by the horizontal synchronization frequency detection circuit 38 and the frequency of the (internal) vertical synchronization signal detected by the vertical synchronization frequency detection circuit 58.

Once the type of the camera 48 is identified, the CPU 50 selects, from the synchronization signal generation circuit group, the synchronization signal generation circuit 44 corresponding to the type of the camera 48 identified in step 106, and allows, at desired timing, the selected synchronization signal generation circuit 44 to generate the vertical synchronization signal and the horizontal synchronization signal, as the external synchronization signal, at the frequencies suitable for the connected camera 48 and supply the signals to the camera 48 (step S108). Further, the CPU 50 automatically allocates the data area for image processing to the RAM 54 depending on the number of pixels of the camera 48 identified in step 106 (step S110).

As described above, the image processor 30 depicted in FIG. 1 can automatically perform, as the preliminary preparation for image processing, the determination of the type of the camera 48 connected to the image processor 30, the setting of the frequencies of the vertical synchronization signal and the horizontal synchronization signal, as the external synchronization signal, suitable for the connected camera 48, and the allocation of the data area for image processing depending on the number of pixels of the connected camera 48. Consequently, it becomes unnecessary for the operator of the image processor 30 to perform the preliminary preparation corresponding to the camera 48 connected to the image processor 30, and thus it is possible to prevent errors from occurring in the setting and allocation.

After the preliminary preparation described above is completed, the image processor 30 generates the vertical synchronization signal and the horizontal synchronization signal by the selected synchronization signal generation circuit 44 and supplies the generated vertical and horizontal synchronization signals to the camera 48 as the external synchronization signal, whenever it is desired to perform the image processing (i.e., at desired timing). The frequencies of the vertical and horizontal synchronization signals, as the external synchronization signal, are suitable for the connected camera 48. In particular, the frequency of the (external) horizontal synchronization signal is identical to the frequency of the (internal) horizontal synchronization signal detected by the horizontal synchronization frequency detection circuit 38. Then, the camera 48 outputs the data of the image captured by the camera 48 as the video signal synchronized with the external synchronization signal provided from the image processor 30, due to the external synchronization function. The video signal output from the camera 48 is input to the synchronization signal separation circuit 32 in the image processor 30, and is separated into the analog image data, the (external) horizontal synchronization signal and the (external) vertical synchronization signal. The separated analog image data is converted into digital image data by the A/D conversion circuit 34. When the A/D conversion is performed, the clamp circuit 36 keeps the black level of the image data constant, by using the (external) horizontal synchronization signal separated by the synchronization signal separation circuit 32, so as to accurately perform the A/D conversion.

The digital image data output from the A/D conversion circuit 34 is imported via the image capture circuit 40 into the data area for image processing prepared in the RAM 54. According to the image processing program stored in the RAM 54, the CPU 50 performs the image processing to the imported digital image data and recognizes the position of the workpiece W. The robot controller 14 (FIG. 6) estimates a time when the workpiece W reaches a predetermined target position based on the position of the workpiece W (FIG. 6) recognized by the image processor 30, and makes the robot 12 (FIG. 6) hold the workpiece W reaching the target position.

In the first embodiment, the type of the camera 48 is identified based on the frequency of the internal synchronization signal (in particular, the horizontal synchronization signal) of the camera 48, so as to generate the external synchronization signal having the frequency suitable for the camera 48, and the number of pixels of the camera 48 can also be identified based on the frequency of the internal synchronization signal. However, in the case where cameras 48 having an identical number of pixels are used, it is not necessary to identify the number of pixels of the camera 48. In this case, it is not necessary for the ROM 52 in the processing section 42 to previously store the number of pixels in correspondence with the type of the camera 48.

Figure 2:
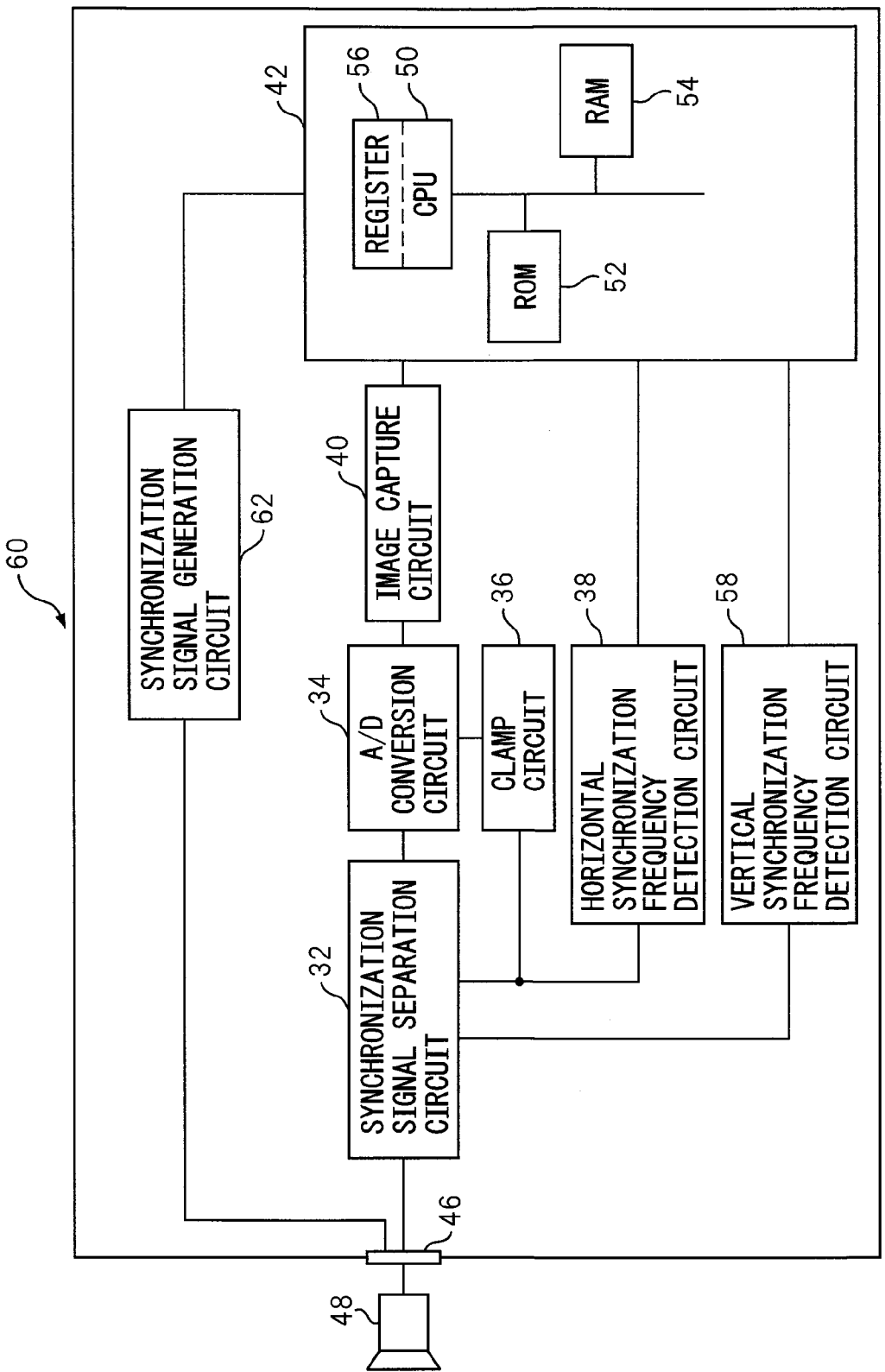
FIG. 2 is a block diagram depicting an overall configuration of an image processor according to a second embodiment of the present invention.

Referring to FIG. 2, an image processor 60 according to a second embodiment will be described.

The image processor 60 according to the second embodiment differs from the image processor 30 according to the first embodiment in a point that the image processor 60 includes only one synchronization signal generation circuit 62 in place of a plurality of synchronization signal generation circuits 44 in the image processor 30. The synchronization signal generation circuit (i.e., an external synchronization signal generation section) 62 in the image processor 60 can generate a vertical synchronization signal and a horizontal synchronization signal at desired frequencies set by a command from a CPU 50. A ROM 52 in a processing section 42 previously stores information about a correspondence relationship between the type of a camera 48, the frequencies of vertical and horizontal synchronization signals specific to the camera 48, and the number of pixels of the camera 48.

Similarly to the image processor 30 according to the first embodiment, the image processor 60 includes a synchronization signal separation circuit 32, an A/D conversion circuit 34, a clamp circuit 36, a horizontal synchronization frequency detection circuit 38, an image capture circuit 40, a processing section 42, and a single connector 46. The camera 48 is connected to the image processor 60 via the connector 46. The above configuration is the same as that of the image processor 30, and the description thereof is not repeated.

In the operation of a preliminary preparation for image processing performed in the image processor 60, similarly to that in the image processor 30 of the first embodiment, a video signal (synchronized with an internal synchronization signal) output from the camera 48 due to an internal synchronization function is separated into image data, the horizontal synchronization signal and the vertical synchronization signal by the synchronization signal separation circuit 32, the frequency of the separated horizontal synchronization signal (i.e., the internal synchronization signal) is detected by the horizontal synchronization frequency detection circuit 38, and the detected frequency of the horizontal synchronization signal (i.e., the internal synchronization signal) is stored in a register 56 of the CPU 50 in the processing section 42.

The CPU 50 in the processing section 42 reads the frequency of the (internal) horizontal synchronization signal of the camera 48 stored in the register 56. Then, the CPU 50 refers to the information about the correspondence relationship between the type, the frequencies of the horizontal and vertical synchronization signals and the number of pixels, of the camera 48, previously stored in a ROM 52, and identifies the type of the camera 48 connected to the image processor 60, the frequency of the vertical synchronization signal suitable for the said camera 48 and the number of pixels of the said camera 48, based on the frequency of the (internal) horizontal synchronization signal of the camera 48.

Next, the CPU 50 issues a command to the synchronization signal generation circuit 62, so as to automatically set, in the synchronization signal generation circuit 62, the frequencies of the vertical and horizontal synchronization signals suitable for the identified type of the camera 48, and allows, at desired timing, the synchronization signal generation circuit 62 to generate the vertical synchronization signal and the horizontal synchronization signal, as the external synchronization signal, at the automatically set frequencies and supply the signals to the camera 48. Further, the CPU 50 automatically allocates a data area for image processing to a RAM 54 depending on the identified number of pixels of the camera 48. The other operation is the same as that of the image processor 30 according to the first embodiment, and the description thereof is not repeated.

In the second embodiment, it is necessary to at least identify the frequency of the vertical synchronization signal of the camera 48 based on the frequency of the (internal) horizontal synchronization signal of the camera 48, and thus it is not always necessary to identify the type of the camera 48. Further, the inventors of the present application have found that there is certain correspondence relationship between the frequency of the (internal) horizontal synchronization signal of the camera 48 and the number of pixels of the camera 48. Consequently, provided that the ROM 52 previously stores the correspondence relationship between the frequency of the vertical synchronization signal, the frequency of the horizontal synchronization signal and the number of pixels, of the camera 48, it is possible to determine, based on the frequency of the (internal) horizontal synchronization signal of the camera 48, the frequency of the vertical synchronization signal and the number of pixels, corresponding thereto, without identifying the type of the camera 48.

Further, in the case where the image processor 60 is used in the robot system 10 (FIG. 6), it is necessary that the image processor 60 can at least recognize the position of the workpiece W based on the image obtained by the camera 48 at desired timing. Therefore, if the vertical synchronization signal indicating the starting position of the image data of the single image and the subsequent horizontal synchronization signal having a predetermined frequency are supplied, as the external synchronization signal, to the camera 48 at the desired timing, the image processor 60 can recognize the image data output from the camera 48 at the said timing as the image data of the entire single image. Consequently, provided that the CPU 50 is configured to allow the synchronization signal generation circuit 62 to output the leading vertical synchronization signal and the subsequent horizontal synchronization signal having the predetermined frequency at the desired timing, the frequency of the vertical synchronization signal is not needed. Thus, the image processor 60 may have a configuration wherein the ROM 52 previously stores the correspondence relationship only between the frequency of the horizontal synchronization signal and the number of pixels, and only the number of pixels is determined based on the corresponding frequency of the (internal) horizontal synchronization signal of the camera 48. In this case, it is necessary for the CPU 50 to at least set, in the synchronization signal generation circuit 62, the frequency of the (internal) horizontal synchronization signal of the camera 48 detected by the horizontal synchronization frequency detection circuit 38 and automatically allocate the data area for image processing to the RAM 54 depending on the determined number of pixels.

In the second embodiment, not only the external synchronization signal having the frequency suitable for the camera 48 can be generated but also the number of pixels of the camera 48 can be identified, based on the frequency of the (internal) horizontal synchronization signal of the camera 48. However, in the case where only cameras 48 having the identical number of pixels are used, it is not necessary to identify the number of pixels of the camera 48. Further, as described above, the frequency of the vertical synchronization signal is not always necessary. Consequently, the ROM 52 in the processing section 42 may store no information on the aforementioned correspondence relationship.

Figure 3:
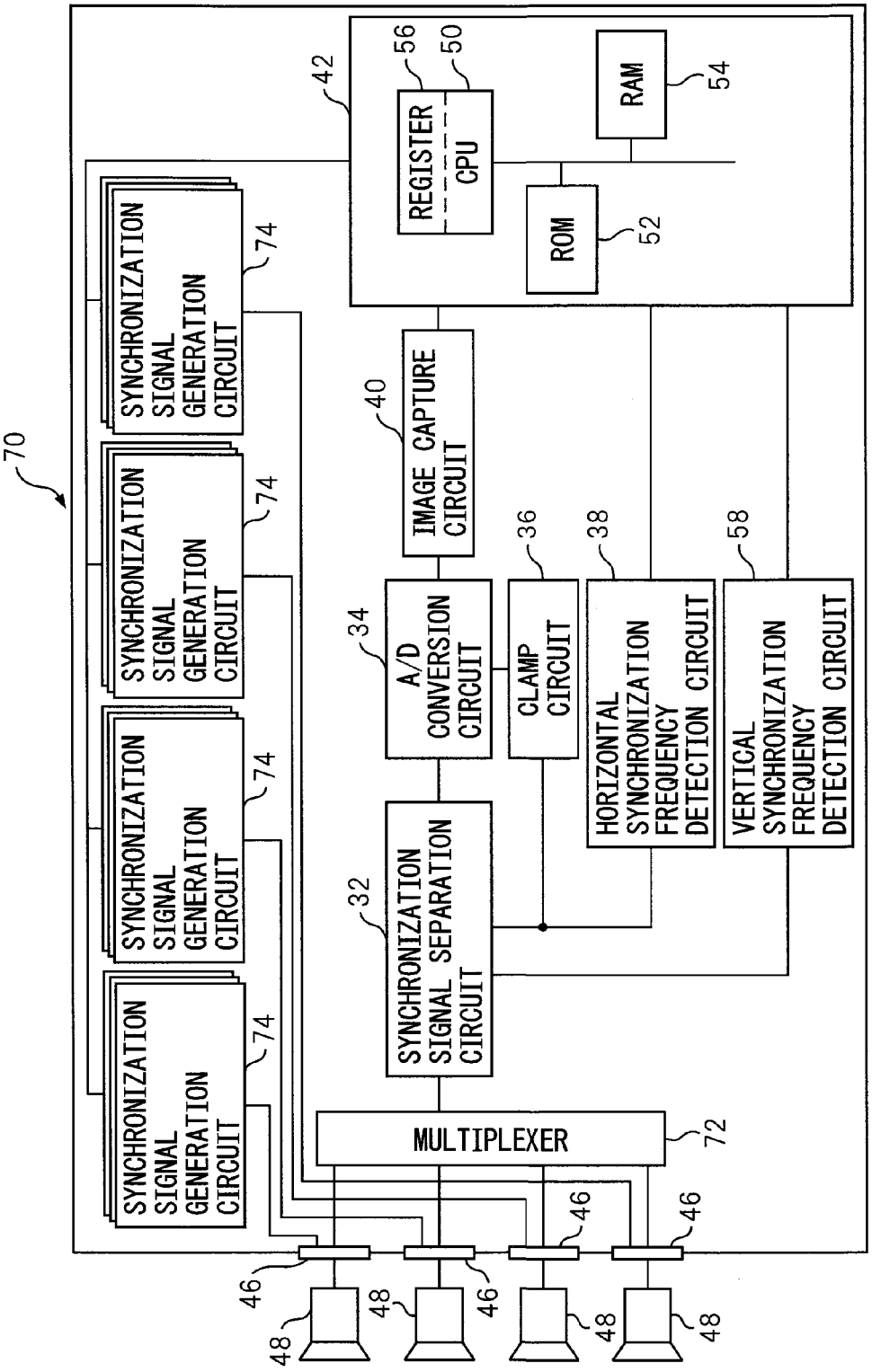
FIG. 3 is a block diagram depicting an overall configuration of an image processor according to a third embodiment of the present invention.

Referring to FIG. 3, an image processor 70 according to a third embodiment will be described.

Similarly to the image processor 30 according to the first embodiment, the image processor 70 according to the third embodiment includes a synchronization signal separation circuit 32, an A/D conversion circuit 34, a clamp circuit 36, a horizontal synchronization frequency detection circuit 38, an image capture circuit 40, and a processing section 42. The image processor 70 differs from the image processor 30 according to the first embodiment in a point that the image processor 70 further includes a plurality of connectors 46, a multiplexer 72, and synchronization signal generation circuits (i.e., external synchronization signal generation sections) 74 corresponding respectively to the connectors 46, so that a plurality of cameras 48 can be simultaneously connected to the image processor 70 via the plurality of connectors 46.

The multiplexer 72 is disposed between the connectors 46 and the synchronization signal separation circuit 32, and the cameras 48 are connected to the multiplexer 72 via the connectors 46. The multiplexer 72 selects any one connector 46 among the plurality of connectors 46 in accordance with, e.g., a selection command from a CPU 50 in the processing section 42, and sends a video signal only from the camera 48 connected to the selected connector 46 to the synchronization signal separation circuit 32. The synchronization signal generation circuit 74 corresponding to each connector 46 belongs to each of synchronization signal generation circuit groups respectively including a plurality of synchronization signal generation circuits 74. The synchronization signal generation circuits 74 in each synchronization signal generation circuit group are associated respectively with the several types of cameras 48 that can be connected to each connector 46, and each synchronization signal generation circuit 74 is previously configured to generate a vertical synchronization signal and a horizontal synchronization signal, as an external synchronization signal, at frequencies suitable for the associated type of camera 48.

The synchronization signal separation circuit 32, the A/D conversion circuit 34, the clamp circuit 36, the horizontal synchronization frequency detection circuit 38, the image capture circuit 40 and the processing section 42, in the image processor 70, are the same as those in the image processor 30 of the first embodiment, and the descriptions thereof are not repeated.

In the operation of a preliminary preparation for image processing in the image processor 70, video signals (synchronized with respective internal synchronization signals) output from the plurality of cameras 48 connected to the image processor 70 due to respective internal synchronization functions are input to the multiplexer 72 via the respective connectors 46. Then, only the video signal from the camera 48 connected to any one connector 46 selected by the multiplexer 72 is input to the synchronization signal separation circuit 32. Similarly to the image processor 30 of the first embodiment, the video signal input to the synchronization signal separation circuit 32 is separated into image data, the horizontal synchronization signal and the vertical synchronization signal, the frequency of the separated horizontal synchronization signal (i.e., the internal synchronization signal) is detected by the horizontal synchronization frequency detection circuit 38, and the detected frequency of the horizontal synchronization signal (i.e., the internal synchronization signal) is stored in a register 56 of the CPU 50 in the processing section 42.

The CPU 50 in the processing section 42 reads the frequency of the (internal) horizontal synchronization signal of the camera 48 stored in the register 56. Then, the CPU 50 refers to the information about the correspondence relationship between the type, the frequencies of the horizontal and vertical synchronization signals and the number of pixels, of the camera 48, previously stored in a ROM 52, and identifies the type of the camera 48 connected to the image processor 70 via the connector 46 selected by the multiplexer 72, the frequency of the vertical synchronization signal suitable for the said camera 48 and the number of pixels of the said camera 48, based on the frequency of the (internal) horizontal synchronization signal of the camera 48.

Next, the CPU 50 selects, from the synchronization signal generation circuit group corresponding to the connector 46 selected by the multiplexer 72, the synchronization signal generation circuit 74 corresponding to the identified type of the camera 48, and allows, at desired timing, the selected synchronization signal generation circuit 74 to generate the vertical synchronization signal and the horizontal synchronization signal, as the external synchronization signal, and supply the signals to the camera 48. Further, the CPU 50 automatically allocates a data area for image processing to a RAM 54 depending on the identified number of pixels of the camera 48.

Next, the multiplexer 72 selects another connector 46 (and thus, another camera 48) in accordance with, e.g., a selection command from the CPU 50 in the processing section 42. The CPU 50 performs a procedure similar to the aforementioned procedure, and thereby identifies the type of the camera 48 connected to the connector 46 selected by the multiplexer 72, the frequency of the vertical synchronization signal suitable for the said camera 48 and the number of pixels of the said camera 48. Then, the CPU 50 selects, from the synchronization signal generation circuit group corresponding to the selected connector 46, the synchronization signal generation circuit 74 corresponding to the identified type of the camera 48, and allows, at desired timing, the selected synchronization signal generation circuit 74 to generate the vertical synchronization signal and the horizontal synchronization signal, as the external synchronization signal, and supply the signals to the camera 48. Further, the CPU 50 automatically allocates the data area for image processing to the RAM 54 depending on the identified number of pixels of the camera 48.

The multiplexer 72 successively selects all connectors 46 in accordance with, e.g., selection commands from the CPU 50 in the processing section 42, and the CPU 50 repeatedly performs the operations for the preliminary preparation described above. The other operation is the same as that in the first embodiment, and the description thereof is not repeated.

Also in the third embodiment, in the case where cameras 48 having an identical number of pixels are used, it is not necessary to identify the number of pixels of the camera. In this case, it is not necessary for the ROM 52 in the processing section 42 to previously store the number of pixels in correspondence with the type of camera 48.

Figure 4:
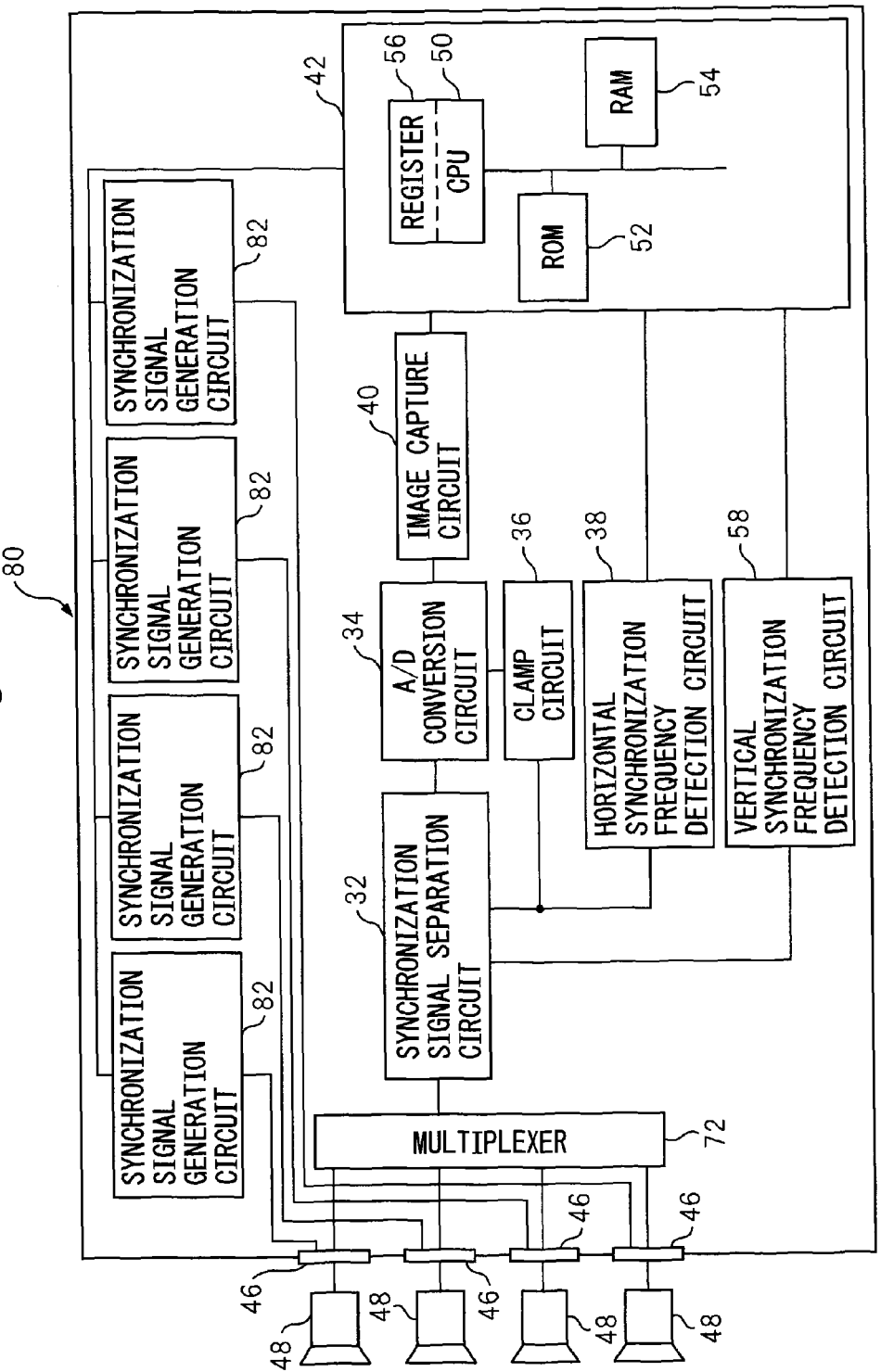
FIG. 4 is a block diagram depicting an overall configuration of an image processor according to a fourth embodiment of the present invention.

Referring to FIG. 4, an image processor 80 according to a fourth embodiment will be described.

The image processor 80 according to the fourth embodiment has a configuration similar to that of the image processor 70 according to the third embodiment, but differs from the image processor 70 in a point that the image processor 80 includes only one synchronization signal generation circuit 82 provided to correspond to each of a plurality of connectors 46, in place of a plurality of synchronization signal generation circuits 74 provided to correspond to each of a plurality of connectors 46 in the image processor 70. Each synchronization signal generation circuit (i.e., an external synchronization signal generation section) 82 in the image processor 80 can generate a vertical synchronization signal and a horizontal synchronization signal at desired frequencies set by a command from a CPU 50. A ROM 52 in a processing section 42 previously stores information about a correspondence relationship between the type of a camera 48, the frequencies of vertical and horizontal synchronization signals specific to the camera 48, and the number of pixels of the camera 48.

Similarly to the image processor 70 according to the third embodiment, the image processor 80 includes a synchronization signal separation circuit 32, an A/D conversion circuit 34, a clamp circuit 36, a horizontal synchronization frequency detection circuit 38, an image capture circuit 40, a processing section 42, and a plurality of connectors 46, wherein a plurality of cameras 48 are connected respectively to the connectors 46. The above configuration is the same as that of the image processor 70, and the description thereof is not repeated.

In the operation of a preliminary preparation for image processing in the image processor 80, similarly to that in the image processor 70 of the third embodiment, video signals (synchronized with respective internal synchronization signals) output from the plurality of cameras 48 connected to image processor 80 due to respective internal synchronization functions are input to the multiplexer 72 via the respective connectors 46. Then, only the video signal from the camera 48 connected to any one connector 46 selected by the multiplexer 72 is sent to the synchronization signal separation circuit 32. Similarly to the image processor 70 of the third embodiment, the video signal input to the synchronization signal separation circuit 32 is separated into image data, the horizontal synchronization signal and the vertical synchronization signal, the frequency of the separated horizontal synchronization signal (i.e., the internal synchronization signal) is detected by the horizontal synchronization frequency detection circuit 38, and the detected frequency of the horizontal synchronization signal (i.e., the internal synchronization signal) is stored in a register 56 of the CPU 50 in the processing section 42.

The CPU 50 in the processing section 42 reads the frequency of the (internal) horizontal synchronization signal of the camera 48 stored in the register 56. Then, the CPU 50 refers to the information about the correspondence relationship between the type, the frequencies of the horizontal and vertical synchronization signals and the number of pixels, of the cameras 48, previously stored in a ROM 52, and identifies the type of the camera 48 connected to the connector 46 selected by the multiplexer 72, the frequency of the vertical synchronization signal suitable for the said camera 48 and the number of pixels of the said camera 48, based on the frequency of the (internal) horizontal synchronization signal of the camera 48.

Next, the CPU 50 issues a command to the synchronization signal generation circuit 82 corresponding to the connector 46 selected by the multiplexer 72, so as to automatically set, in the said synchronization signal generation circuit 82, the frequencies of the vertical and horizontal synchronization signals suitable for the identified type of the camera 48, and allows, at desired timing, the synchronization signal generation circuit 82 to generate the vertical synchronization signal and the horizontal synchronization signal, as the external synchronization signal, at the automatically set frequencies and supply the signals to the camera 48. Further, the CPU 50 automatically allocates a data area for image processing to a RAM 54 depending on the identified number of pixels of the camera 48.

Next, the multiplexer 72 selects another connector 46 in accordance with, e.g., a selection command from the CPU 50 in the processing section 42. The CPU 50 performs a procedure similar to the aforementioned procedure, and thereby identifies the type of the camera 48 connected to the connector 46 selected by the multiplexer 72, the frequency of the vertical synchronization signal suitable for the said camera 48 and the number of pixels of the said camera 48. Then, the CPU 50 automatically set, in the synchronization signal generation circuit 82 corresponding to the selected connector 46, the frequencies of the vertical and horizontal synchronization signals suitable for the identified type of the camera 48, and allows, at desired timing, the synchronization signal generation circuit 82 to generate the vertical synchronization signal and the horizontal synchronization signal, as the external synchronization signal, at the automatically set frequencies and supply the signals to the camera 48. Further, the CPU 50 automatically allocates the data area for image processing to the RAM 54 depending on the identified number of pixels of the camera 48.

The multiplexer 72 successively selects all connectors 46 in accordance with, e.g., selection commands from the CPU 50 in the processing section 42, and the CPU 50 repeatedly performs the operations for the preliminary preparation described above. The other operation is the same as that in the image processor 70 of the third embodiment, and the description thereof is not repeated.

Also in the fourth embodiment, similarly to the second embodiment, the ROM 52 may previously store the correspondence relationship between the frequency of the vertical synchronization signal, the frequency of the horizontal synchronization signal and the number of pixels, of camera 48, so as to determine, based on the frequency of the (internal) horizontal synchronization signal of the camera 48, the frequency of the vertical synchronization signal and the number of pixels, corresponding thereto. Further, provided that the CPU 50 is configured to allow the synchronization signal generation circuit 82 to output the leading vertical synchronization signal and the subsequent horizontal synchronization signal having the predetermined frequency at the desired timing, the frequency of the vertical synchronization signal is not needed. Consequently, the ROM 52 may previously store the correspondence relationship only between the frequency of the horizontal synchronization signal and the number of pixels, and only the number of pixels is determined based on the corresponding frequency of the (internal) horizontal synchronization signal of the camera 48. In this case, it is necessary for the CPU 50 to at least set, in each of the synchronization signal generation circuits 82, the frequency of the (internal) horizontal synchronization signal of the camera 48 detected by the horizontal synchronization frequency detection circuit 38 and automatically allocate the data area for image processing to the RAM 54 depending on the determined number of pixels. Still further, as described in the second embodiment, in the case where only cameras 48 having the identical number of pixels are used, it is not necessary to identify the number of pixels of the camera 48, and the frequency of the vertical synchronization signal is not always needed. Consequently, the ROM 52 in the processing section 42 may store no information about the aforementioned correspondence relationship.

Various aspects of the present invention will be described below.

According to one aspect of the present invention, an image processor for a robot system is provided, the robot system comprising a camera having a first function outputting a first video signal including obtained image data as well as an internal vertical synchronization signal and an internal horizontal synchronization signal, generated as an internal synchronization signal at a predetermined frequency, and a second function outputting a second video signal including image data obtained based on an external vertical synchronization signal and an external horizontal synchronization signal, supplied as an external synchronization signal having a frequency identical to the frequency of the internal synchronization signal, as well as the external vertical synchronization signal and the external horizontal synchronization signal, the image processor configured to import the second video signal output from the camera and perform image processing, wherein the image processor comprises a synchronization signal separation section separating the internal horizontal synchronization signal from the first video signal output from the camera; a synchronization frequency detection section detecting a frequency of the internal horizontal synchronization signal separated by the synchronization signal separation section; an external synchronization signal generation section generating the external vertical synchronization signal and the external horizontal synchronization signal; and a processing section allowing, at desired timing, the external synchronization signal generation section to generate the external vertical synchronization signal, to generate the external horizontal synchronization signal at the frequency of the internal horizontal synchronization signal detected by the synchronization frequency detection section, and to supply the external vertical synchronization signal and the external horizontal synchronization signal, thus generated, to the camera.

The image processor described above separates the internal horizontal synchronization signal from the first video signal output from the camera and automatically generates the external horizontal synchronization signal at the frequency of the separated internal horizontal synchronization signal, so that it is not necessary for an operator to set the frequency of the external horizontal synchronization signal. In this connection, in the case of the image processor provided in the robot system, it is necessary that at least image data at desired timing (i.e., a still image) can be obtained instead of continuous image data (i.e., a moving image). Further, if the vertical synchronization signal indicating the starting position of the image data of the single image and the subsequent horizontal synchronization signal having a predetermined frequency are supplied, as the external synchronization signal, to the camera at the desired timing, the image data is output from the camera at the said timing. Consequently, it is necessary that the external synchronization signal generation section at least generates the vertical synchronization signal at the desired timing, and it is not always necessary to set the frequency of the external vertical synchronization signal. Thus, in the image processor described above, it is not necessary for the operator to set the frequencies of the external synchronization signal depending on the type of the camera.

The image processor described above may further comprise a storage section previously storing a correspondence relationship between a type of the camera and a frequency of a horizontal synchronization signal specific to the camera. In this configuration, the processing section may use the correspondence relationship stored in the storage section to identify the type of the camera based on the frequency of the internal horizontal synchronization signal detected by the synchronization frequency detection section, and allows the external synchronization signal generation section to generate the external vertical synchronization signal and the external horizontal synchronization signal at frequencies corresponding to the type of the camera thus identified.

The image processor described above may comprise several external synchronization signal generation sections, each generating the external vertical synchronization signal and the external horizontal synchronization signal at frequencies corresponding to each of several types of cameras. In this configuration, the processing section may select the external synchronization signal generation section associated with the type of the camera thus identified, among the several external synchronization signal generation sections, and allows the external synchronization signal generation section thus selected, to generate the external vertical synchronization signal and the external horizontal synchronization signal and to supply them to the camera.

The image processor described above may further comprise a storage section previously storing a correspondence relationship between a type of the camera, a frequency of a horizontal synchronization signal specific to the camera and number of pixels of the camera. In this configuration, the processing section may use the correspondence relationship stored in the storage section to identify the number of pixels of the camera based on the frequency of the internal horizontal synchronization signal detected by the synchronization frequency detection section, and allocates a data area for image processing based on the number of pixels of the camera thus identified. As a result, it is not necessary for an operator to allocate the data area for image processing depending on the number of pixels of the camera in use.

The image processor described above may further comprise a multiplexer connected to several cameras, so that the first video signal may be input from the camera selected by the multiplexer to the synchronization signal separation section.

According to another aspect of the present invention, a robot system performing a robot operation based on a result of image processing is provided, the robot system comprising a robot; a camera having a first function outputting a first video signal including obtained image data as well as an internal vertical synchronization signal and internal horizontal synchronization signal, generated as an internal synchronization signal at a predetermined frequency, and a second function outputting a second video signal including image data obtained based on an external vertical synchronization signal and an external horizontal synchronization signal, supplied as an external synchronization signal having a frequency identical to the frequency of the internal synchronization signal, as well as the external vertical synchronization signal and the external horizontal synchronization signal; and an image processor configured to import the second video signal output from the camera and perform an image processing, wherein the image processor comprises a synchronization signal separation section separating the internal horizontal synchronization signal from the first video signal output from the camera; a synchronization frequency detection section detecting a frequency of the internal horizontal synchronization signal separated by the synchronization signal separation section; an external synchronization signal generation section generating the external vertical synchronization signal and the external horizontal synchronization signal; and a processing section allowing, at desired timing, the external synchronization signal generation section to generate the external vertical synchronization signal, to generate the external horizontal synchronization signal at the frequency of the internal horizontal synchronization signal detected by the synchronization frequency detection section, and to supply the external vertical synchronization signal and the external horizontal synchronization signal, thus generated, to the camera.

While the invention has been described with reference to the preferred embodiments thereof, it will be understood, by those skilled in the art, that various changes or modifications may be made thereto without departing from the scope of the following claims.

The invention claimed is:

1. An image processor for a robot system, the robot system comprising a camera having a first function for outputting a first video signal including obtained image data as well as an internal vertical synchronization signal and an internal horizontal synchronization signal, generated as an internal synchronization signal at a predetermined frequency, and a second function for outputting a second video signal including image data obtained based on an external vertical synchronization signal and an external horizontal synchronization signal, supplied as an external synchronization signal having a frequency identical to the frequency of said internal synchronization signal, as well as the external vertical synchronization signal and the external horizontal synchronization signal;

the camera being adapted to output, when said external synchronization signal is not supplied, said video signal synchronized with said internal synchronization signal by said first function, and to output, when said external synchronization signal is supplied, said video signal synchronized with said external synchronization signal by said second function;

the image processor being configured to import the second video signal output from the camera and perform image processing, wherein said image processor comprises:

a synchronization signal separation section for separating said internal horizontal synchronization signal from said first video signal output from said camera and synchronized with the internal synchronization signal;

a synchronization frequency detection section for detecting a frequency of said internal horizontal synchronization signal separated by said synchronization signal separation section;

an external synchronization signal generation section for generating said external vertical synchronization signal and said external horizontal synchronization signal; and a processing section for allowing, at desired timing, said external synchronization signal generation section to generate said external vertical synchronization signal, to generate said external horizontal synchronization signal at said frequency of said internal horizontal synchronization signal detected by said synchronization frequency detection section, and to supply said external vertical synchronization signal and said external horizontal synchronization signal, thus generated, to said camera.

2. An image processor for a robot system, according to claim 1, further comprising a storage section for previously storing a correspondence relationship between a type of said camera and a frequency of a horizontal synchronization signal specific to said camera, wherein said processing section uses said correspondence relationship stored in said storage section to identify the type of said camera based on said frequency of said internal horizontal synchronization signal detected by said synchronization frequency detection section, and allows said external synchronization signal generation section to generate said external vertical synchronization signal and said external horizontal synchronization signal at frequencies corresponding to the type of said camera thus identified.

3. An image processor for a robot system, according to claim 2, comprising several external synchronization signal generation sections, each for generating said external vertical synchronization signal and said external horizontal synchronization signal at frequencies corresponding to each of several types of cameras, wherein said processing section selects said external synchronization signal generation section associated with the type of said camera thus identified, among said several external synchronization signal generation sections, and allows said external synchronization signal generation section thus selected, to generate said external vertical synchronization signal and said external horizontal synchronization signal and to supply them to said camera.

4. An image processor for a robot system, according to claim 1, further comprising a storage section for previously storing a correspondence relationship between a type of said camera, a frequency of a horizontal synchronization signal specific to said camera and number of pixels of said camera, wherein said processing section uses said correspondence relationship stored in said storage section to identify the number of pixels of said camera based on said frequency of said internal horizontal synchronization signal detected by said synchronization frequency detection section, and allocates a data area for image processing based on the number of pixels of said camera thus identified.

5. An image processor for a robot system, according to claim 1, further comprising a multiplexer connected to several cameras, wherein said first video signal is input from said camera selected by said multiplexer to said synchronization signal separation section.

6. A robot system for performing a robot operation based on a result of an image processing, said robot system comprising:

a robot;

a camera having a first function for outputting a first video signal including obtained image data as well as an internal vertical synchronization signal and an internal horizontal synchronization signal, generated as an internal synchronization signal at a predetermined frequency, and a second function for outputting a second video signal including image data obtained based on an external vertical synchronization signal and an external horizontal synchronization signal, supplied as an external synchronization signal having a frequency identical to the frequency of said internal synchronization signal, as well as the external vertical synchronization signal and the external horizontal synchronization signal, the camera being adapted to output, when said external synchronization signal is not supplied, said video signal synchronized with said internal synchronization signal by said first function, and to output, when said external synchronization signal is supplied, said video signal synchronized with said external synchronization signal by said second function; and an image processor configured to import said second video signal output from said camera and perform the image processing, wherein said image processor comprises:

a synchronization signal separation section for separating said internal horizontal synchronization signal from said first video signal output from said camera and synchronized with the internal synchronization signal;

a synchronization frequency detection section for detecting a frequency of said internal horizontal synchronization signal separated by said synchronization signal separation section;

an external synchronization signal generation section for generating said external vertical synchronization signal and said external horizontal synchronization signal; and a processing section for allowing, at desired timing, said external synchronization signal generation section to generate said external vertical synchronization signal to generate said external horizontal synchronization signal at said frequency of said internal horizontal synchronization signal detected by said synchronization frequency detection section, and to supply said external vertical synchronization signal and said external horizontal synchronization signal, thus generated, to said camera.

* * * * *